United States Patent
Schilling et al.

(10) Patent No.: US 8,646,395 B2
(45) Date of Patent: Feb. 11, 2014

(54) SINGLE-PASS, DOUBLE-SHOOT OPENER FOR AN AGRICULTURAL IMPLEMENT

(75) Inventors: Robin B. Schilling, Darfield (CA); Matthew S. Naylor, Saskatoon (CA); Dennis W. Chahley, Martensville (CA)

(73) Assignee: CNH Canada, Ltd., Saskatoon, Saskatchewan (CA)

(*) Notice: Subject to any disclaimer, the term of this patent is extended or adjusted under 35 U.S.C. 154(b) by 285 days.

(21) Appl. No.: 12/730,783

(22) Filed: Mar. 24, 2010

(65) Prior Publication Data

US 2011/0232552 A1  Sep. 29, 2011

(51) Int. Cl.
*A01C 5/00* (2006.01)

(52) U.S. Cl.
USPC ........... 111/135; 111/137; 111/163; 111/167; 111/170; 111/194

(58) Field of Classification Search
USPC ......... 111/150, 187, 186, 129, 194, 163, 157, 111/149, 167, 170, 190, 52, 59, 62, 111/134–137; 172/558–566, 606, 610
See application file for complete search history.

(56) References Cited

U.S. PATENT DOCUMENTS

| 191,054 A | 5/1877 | Hill |
|---|---|---|
| 332,856 A | 12/1885 | Worthington |
| 1,006,771 A | 10/1911 | Metzler |
| 1,058,657 A | 4/1913 | Broman et al. |
| 1,168,594 A | 1/1916 | Berendes |
| 1,229,194 A | 6/1917 | Patric |
| 1,234,372 A | 7/1917 | Miller |
| 1,317,402 A | 9/1919 | Taylor |
| 1,901,299 A | 3/1933 | Johnson |
| 2,341,795 A | 2/1944 | Kriegbaum et al. |
| 2,577,775 A | 12/1951 | Lemmon et al. |
| 2,869,489 A | 7/1953 | Buhr |
| 2,771,044 A | 11/1956 | Putifer |
| 2,920,587 A | 12/1956 | Shriver |
| 2,808,792 A | 10/1957 | Brickman |
| 2,829,577 A | 4/1958 | Williams |
| 3,118,506 A | 1/1964 | Morris |
| 3,213,812 A | 10/1965 | Forsyth et al. |
| 3,244,237 A | 4/1966 | Keplinger et al. |
| 3,362,361 A | 1/1968 | Morrison, Jr. |
| 3,396,685 A | 8/1968 | Meiners |
| 3,507,233 A | 4/1970 | Grieg et al. |
| 3,514,828 A * | 6/1970 | Wale ............................... 407/54 |
| 3,718,191 A | 2/1973 | Williams |

(Continued)

FOREIGN PATENT DOCUMENTS

| CA | 1294177 | 1/1992 |
|---|---|---|
| EP | 540995 | 12/1993 |

(Continued)

*Primary Examiner* — Christopher J Novosad
(74) *Attorney, Agent, or Firm* — Rebecca L. Henkel

(57) ABSTRACT

An opener for depositing fertilizer and seed in a single pass, double-shoot manner includes a rotating disc that cuts a furrow in a planting surface, a fertilizer tube that drops fertilizer into the furrow, and a trailing seed tube assembly, having a cutting edge, that cuts a vertically and horizontally offset trench in the furrow to form a seed bed in the planting surface onto which seed is deposited. The seed trench provides a seed bed that is offset from the bottom of the furrow to provide horizontal and vertical stratification of the seed and fertilizer.

7 Claims, 5 Drawing Sheets

(56) References Cited

U.S. PATENT DOCUMENTS

| | | |
|---|---|---|
| 4,031,834 A | 6/1977 | Klenke |
| 4,275,670 A | 6/1981 | Dreyer |
| 4,275,671 A | 6/1981 | Baker |
| 4,331,205 A | 5/1982 | Sorenson et al. |
| 4,366,760 A | 1/1983 | Dreyer |
| 4,407,207 A | 10/1983 | Dreyer |
| 4,422,392 A | 12/1983 | Dreyer et al. |
| 4,493,274 A | 1/1985 | Robinson, Jr. et al. |
| 4,570,554 A | 2/1986 | Clark |
| 4,596,199 A | 6/1986 | Dietrich, Sr. et al. |
| 4,760,806 A | 8/1988 | Bigbee et al. |
| 4,781,129 A | 11/1988 | Swanson et al. |
| 4,932,340 A | 6/1990 | Benzel |
| 4,998,488 A | 3/1991 | Hansson |
| 5,060,585 A | 10/1991 | Alexander |
| 5,235,922 A | 8/1993 | Deckler |
| 5,269,237 A | 12/1993 | Baker et al. |
| 5,331,907 A | 7/1994 | Beaujot |
| 5,481,990 A | 1/1996 | Zacharias |
| 5,537,942 A | 7/1996 | Wickstrom |
| 5,609,114 A | 3/1997 | Barton |
| 5,752,454 A | 5/1998 | Barton |
| 6,032,593 A | 3/2000 | Wendling et al. |
| 6,059,047 A | 5/2000 | Schimke |
| 6,216,616 B1 | 4/2001 | Bourgault |
| 6,644,226 B2 | 11/2003 | Baker et al. |
| 7,004,090 B2 | 2/2006 | Swanson |
| 7,059,257 B2 | 6/2006 | Summach et al. |
| 7,152,539 B2 | 12/2006 | Swanson |
| 7,159,523 B2 | 1/2007 | Bourgault et al. |
| 2002/0197133 A1 | 12/2002 | Zacharias et al. |
| 2004/0086325 A1 | 5/2004 | Friesen et al. |
| 2005/0120929 A1 | 6/2005 | Friesen et al. |
| 2005/0263046 A1 | 12/2005 | Chen |
| 2005/0263049 A1 | 12/2005 | Summach et al. |
| 2005/0274309 A1 | 12/2005 | Bergen |
| 2008/0257237 A1* | 10/2008 | Friesen et al. ............ 111/150 |

FOREIGN PATENT DOCUMENTS

| | | |
|---|---|---|
| EP | 677239 | 10/1995 |
| EP | 1002457 | 5/2000 |
| FR | 391347 | 10/1908 |
| FR | 1576504 | 8/1969 |
| FR | 2727601 | 12/1994 |
| GB | 2060340 | 5/1981 |

\* cited by examiner

SINGLE-PASS, DOUBLE-SHOOT OPENER FOR AN AGRICULTURAL IMPLEMENT

BACKGROUND OF THE INVENTION

The present invention relates generally to agricultural implements and, more particularly, to an opener that provides double-shoot, single pass deposition of fertilizer and seed onto a planting surface with horizontal and/or vertical stratification.

Fertilizer and seed are generally deposited onto a planting surface in either a single shoot or double shoot manner. With a single shoot planting technique, a mixture of seed and fertilizer is deposited into a single furrow and subsequently packed. With a double shoot planting technique, seed and fertilizer are deposited into separate furrows, which may or may not be closely spaced, and then packed.

A single shoot planting device or opener typically has a single delivery hose through which the mixture of granular fertilizer and seed is delivered to the furrow. More particularly, a single shoot planting device will typically include a cutting tip that is dragged at a depth just below the planting surface. The delivery hose extends along a backside of the cutting tip, or knife, so that the fertilizer and seed mixture is deposited into the furrow immediately after the cutting tip cuts into the planting surface. Ideally, the mixture is deposited in to the furrow before the furrow collapses. The furrow is typically packed by a trailing packing or press wheel.

Another configuration of a single shoot planting device replaces the knife with a disc or coulter that rotates at an angle relative to a line of travel to form a furrow or trench in the planting surface. Because of the angling of the disc, the leading face of the disc pushes soil to one side and creates the furrow while the opposite, trailing face of the disc runs in the "shadow" of the leading face. The seed/fertilizer mixture is dropped to the bottom of the furrow while the furrow is held open by the disc and a cooperating plate (or scraper or seed boot) on the other side. The penetration depth of the disc controls the seed depth. A trailing packer wheel closes the furrow after the mixture is deposited and firms the planting surface (soil).

While single shoot planting units are less complex, it is generally preferred to use a double shoot planting unit which allows seed and fertilizer to be separately deposited into the furrow. When the fertilizer and seed are mixed, reduced concentrations of fertilizer must be used to prevent the seed from becoming damaged, i.e., "burnt". In one exemplary double shoot planting unit, a knife has a side tip (side bander) that trails the leading knife as the planting unit is towed along the planting surface. The knife creates a furrow or fertilizer trench and the side bander forms a ledge in the sidewall of the furrow to effectively form a seed trench or seed bed. The fertilizer and seed trenches are separated from one another both horizontally and vertically. This separation provides a fertilizer/seed stratification that has been found to provide better growing conditions, i.e., higher concentrations of fertilizer may be used without seed "burning".

In yet another type of double shoot planting unit, a pair of rotating discs are used to form separate fertilizer and seed trenches having horizontal and vertical stratification. The leading disc cuts through the planting surface at an angle to cut a furrow or fertilizer trench. A trailing disc cuts through the side of the furrow formed by the leading disc to cut a seed trench that is generally horizontally and vertical offset from the fertilizer trench. U.S. Pat. No. 5,752,454 describes a dual disc, double shoot planting unit.

Dual disc units, such as that described in U.S. Pat. No. 5,752,454, are relatively complex structures with multiple rotating parts such as the discs themselves and associated bearings. This complexity also adds to the overall cost of the planting unit and the implement. Dual disc units, such as those described in the aforementioned patent, have also been found to perform unsatisfactorily in soft soil conditions. More particularly, the discs are generally angled to essentially "dig" into the soil surface to cut a furrow. Since the discs dig into the surface, less down pressure is needed. In harder soil conditions, the disc will effectively dig into the soil as the soil itself provides bias against which the disc can leverage. However, in soft soil conditions, the disc will essentially "plow" through the soil rather than cut an open furrow. Furthermore, to accommodate the space needed for two rotational elements, the distance between the leading and trailing discs is relatively substantial and can led to disturbance of the furrow before the seed is planted. In other words, depending upon soil conditions, the furrow may collapse upon itself before the trailing disc cuts a seed bed into the furrow formed by the leading disc. The spacing between the discs also adds to the overall size, weight, and cost of the carrying frame.

SUMMARY OF THE INVENTION

The present invention is directed to a planting unit for depositing fertilizer and seed in a single pass, double shoot manner in which a rotating disc cuts a furrow in a planting surface and a trailing seed boot, having a cutting edge, cuts a vertically and horizontally offset trench in the furrow to form a seed bed. The planting unit is compact yet provides fertilizer and seed stratification.

In operation, the rotating disc, which sits at an angle relative to a line of travel, is pulled to cut a furrow into the planting surface. The furrow effectively defines a fertilizer trench into which fertilizer may be deposited from a fertilizer source through a fertilizer tube. The seed boot has a cutting edge that when pulled through the planting surface cuts a seeding trench in a sidewall of the furrow that is offset both vertically and horizontally from the fertilizer trench. Rearward of the cutting edge is a seed tube through which seed is passed and deposited into the seed trench. A wall support member extends from a rearward edge of the seed tube and is designed to ride along the sidewall of the trench cut by the cutting edge to help hold the trench open as seed is dropped into the trench.

It is therefore an object of the invention to provide a planting unit that furrows a planting surface into separate fertilizer and seed trenches with minimal soil disturbance.

It is another object of the invention to provide fertilizer and seed stratification with a rotating disc and a seed boot having a cutting edge, wherein the seed boot and the rotating disc are coupled to a shared mount.

It is a further object of the invention to provide a compactly designed single-pass, double-shoot opener. Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION OF THE INVENTION

Figure 1:
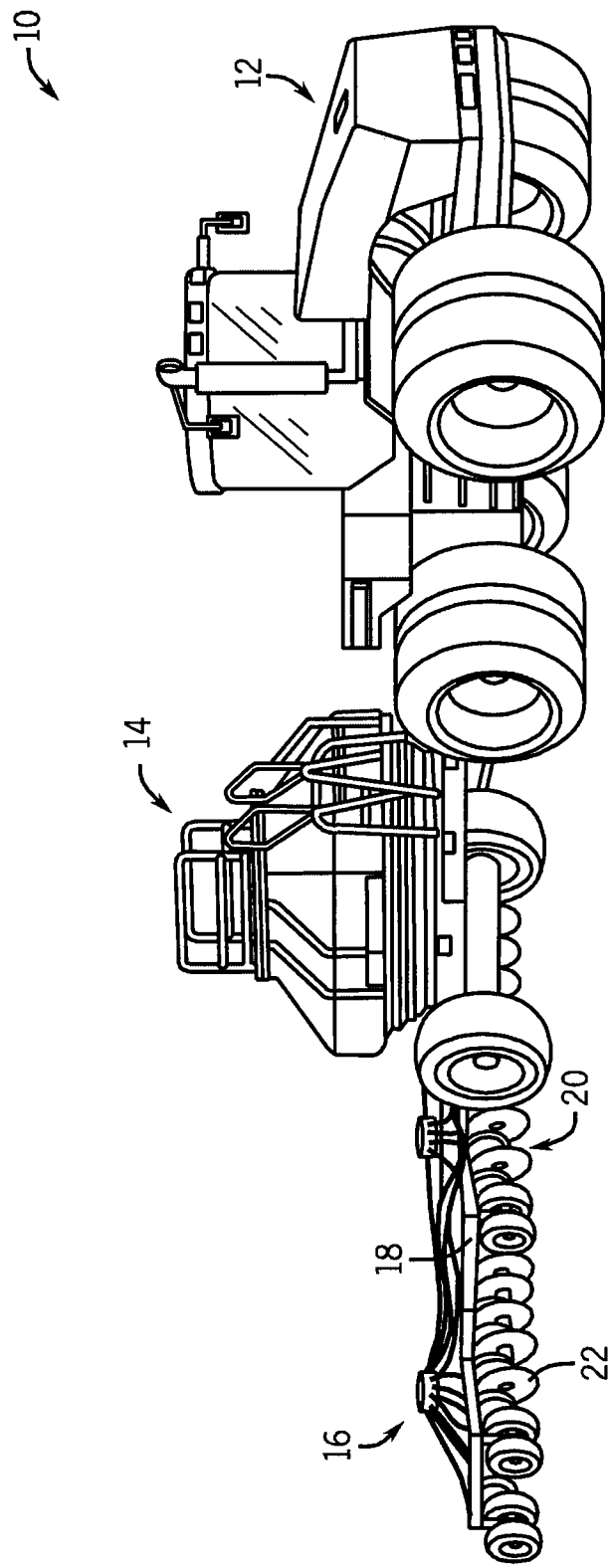
FIG. 1 is a pictorial view of an agricultural planting system incorporating single-pass, double-shoot openers according to one embodiment of the invention.

Referring now to the drawings, and more particularly to FIG. 1, an agricultural seeding system 10 is shown and, as known in the art, is generally comprised of a tractor 12, an air cart 14, and a seeder 16. The air cart 14 and the planter 16 are hitched to the tractor 12 in a conventional manner. The seeder 16 includes a tool bar 18 to which a set of openers 20 are coupled. The openers 20 each include a disc 22 designed to cut a furrow into the soil. As known in the art, the air cart 14 pneumatically delivers seed and/or fertilizer to a set of delivery tubes (not shown) of the seeder 14 whereupon the seed and/or fertilizer is deposited in seed trenches or furrows cut by the discs 22. As will be described, the openers 20 are designed to deposit seed and fertilizer in a furrow with horizontal and vertical stratification in a single pass.

Figure 2:
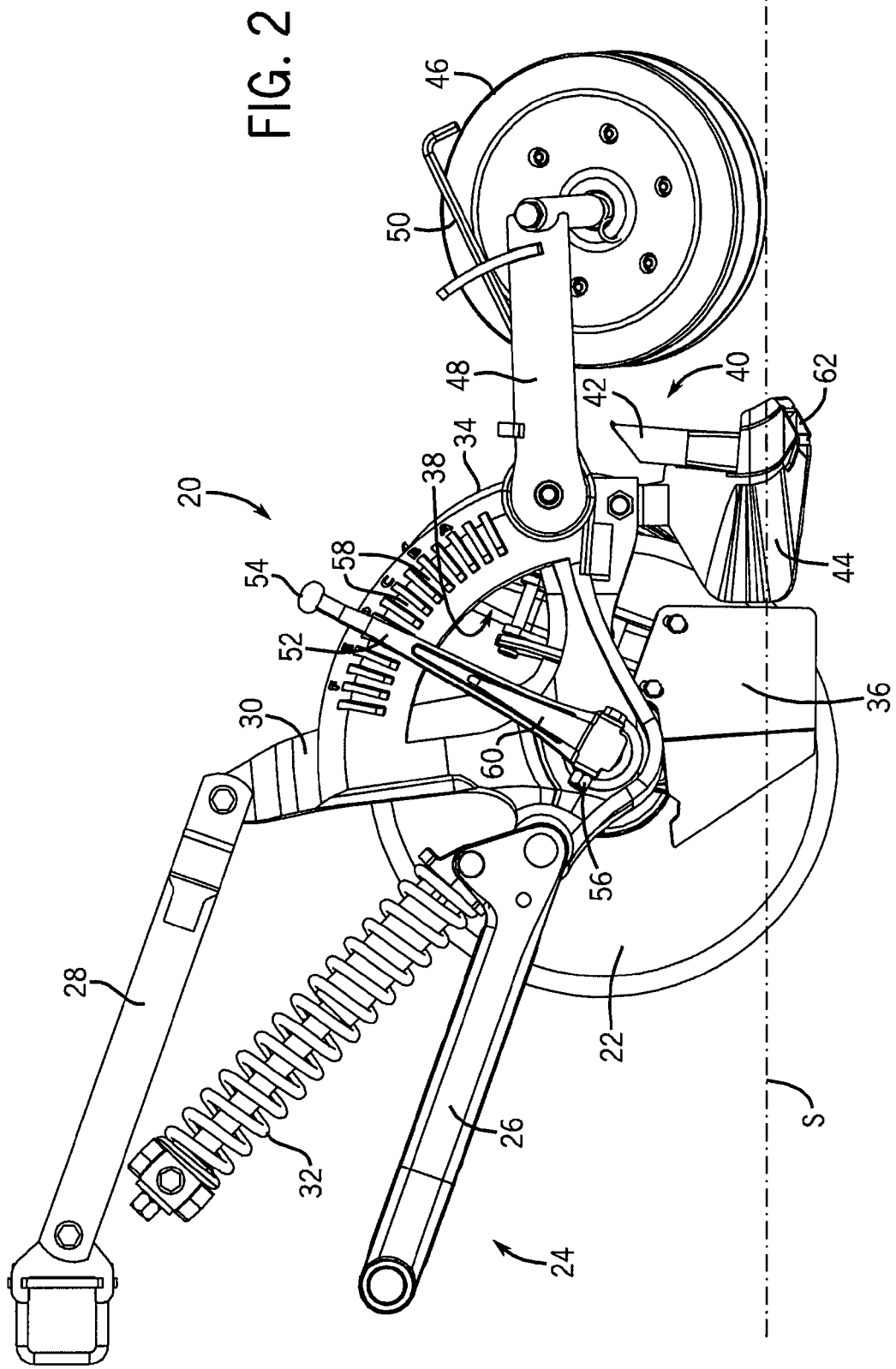
FIG. 2 is a side elevation view of an opener of the planting system shown in FIG. 1.

An exemplary opener 20 is shown in FIG. 2. Each opener 20 includes a parallel linkage assembly 24 that in the illustrated unit includes links 26, 28 that are coupled to the tool bar 18 in a known manner at one end and connected to an opener frame 30 at the opposite end. The opener 20 includes a spring 32 that applies downward pressure on the link 26 and thus onto the frame 30 and the disc 22. Alternately, a hydraulic cylinder may be used to apply such downward pressure. Disc penetration is controlled by a gauge wheel 34 that is positioned in relative close proximity to the disc 22. In addition to controlling the penetration depth of the disc 22 the gauge wheel 34 also helps in keeping the adjacent side of the disc 22 clear of debris. A scraper blade 36 is provided on the opposite side of the disc 22 to keep the leading face of the disc 22 clear of soil, mud, and debris. In one preferred embodiment, the disc 22 is angled at an offset of approximately 7 degrees from vertical; although, different orientations are contemplated. The leading side of the disc 22 displaces soil and creates a furrow in the soil as the disc 22 is pulled through the soil by the tractor 12 or other towing vehicle. In addition to providing a scraping function the scraper blade 36 also helps to hold the furrow open as particulate matter, e.g., seed and granular fertilizer, is deposited into the furrow.

The opener 20 carries a primary product depositing assembly 38 having a fertilizer tube 39 that is flow-coupled to the air cart 14. As known in the art, seed and/or fertilizer is provided to the tube 39 which drops the seed and/or fertilizer into the furrow. A secondary product deposition assembly 40 is also attached to the frame 30 and flow-coupled to the air cart 14. The secondary deposition assembly 40 is generally comprised of a product tube 42 and a leading edge cutting member 44. Having two product delivery tubes 39, 42 allows both fertilizer and seed to be deposited in the furrow in a single pass. The cutting member 44 is adjacent the tube 42 and cuts a trench in the sidewall of the furrow as the disc opener unit 20 is pulled through the soil S. This trench is preferably offset both horizontally and vertically from the bottom of the furrow cut by disc 22. As such, the present invention provides both single pass deposition of seed and fertilizer but also provides stratification between the two, which as known in the art, provides better crop yield. It will be understood however that the opener 20 could be used to deposit only one of seed and fertilizer if so desired.

In one preferred embodiment, the cutting member 44 is angled to lift the soil as the cutting member 44 is urged through the sidewall of the furrow. Thus, as the disc 22 and the cutting member 44 cut through the planting surface, the soil is temporarily displaced and lifted to form trenches for the deposition of fertilizer and seed. However, when disc 22 and the cutting member 44 pass, the soil will tend to fall back onto itself and effectively fill-in the furrow and thus the fertilizer and seed trenches. Alternately, the cutting member 44 may be angled downward to force the soil down onto the fertilizer before the seed is deposited onto the seed bed.

A trailing wheel 46, coupled to the frame 30 by arm 48, packs the furrow after the seed and/or fertilizer has been deposited. The amount of packing pressure applied by the trailing wheel 46 is controlled by a torsion spring 50; although, it is contemplated that other types of biasing devices may be used, such as an extension spring.

The gauge wheel 34 may be raised or lowered by rotation of a depth adjustment arm 52. Arm 52, which includes a generally bulbous handle 54, is pivotably coupled to a spindle (not shown), by a pivot pin 56, about which the disc 22 rotates as it is pulled through the soil. This connection allows the arm 52 to be laterally hinged away from the frame 30 and then rotated to various depth setting positions defined by notches 58 formed in an arc on the frame 30. Each notch corresponds to a different gauge wheel position and thus penetration depth for the disc 22. In one preferred embodiment, the notches 50 allow the gauge wheel 34 to set the penetration depth between 3.2 mm and 87 mm. In a preferred embodiment, the arm 52 has a tooth (not shown) that is selectively received in the notches to set the position of the arm 52. A flat spring 60 biases the arm 52 into engagement with the frame 30. It is understood that other types of depth adjustment arrangements could be used.

Figure 3:
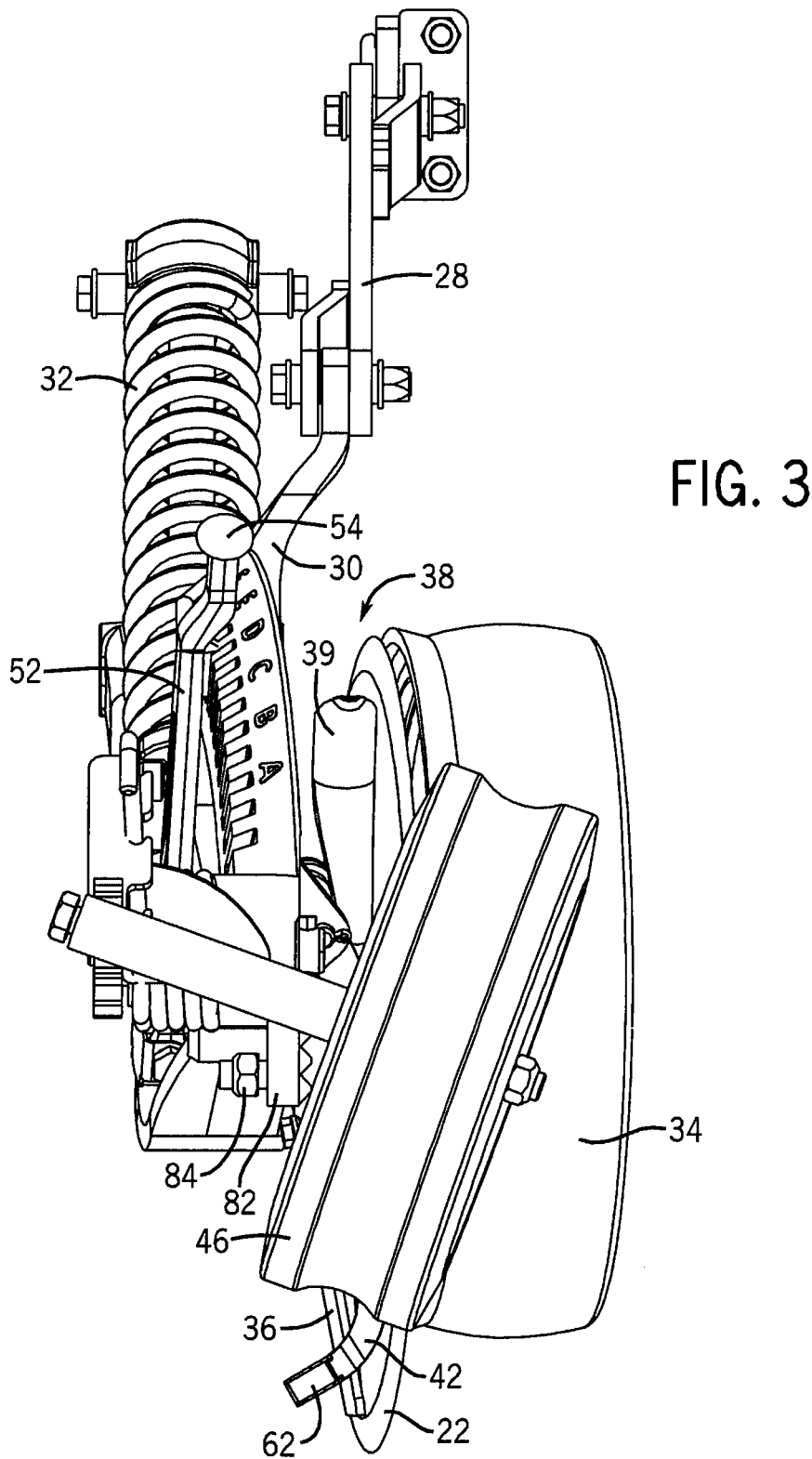
FIG. 3 is a rear elevation view of the opener shown in FIG. 2.

The fertilizer tube 39 is arranged such that the fertilizer falls generally centered in the furrow. As shown in FIG. 3, the seed tube 42 has an outlet 62 that is angled generally rearward and laterally offset from the outlet (not shown) of the fertilizer tube 39. As noted above, the seed trench is formed horizontally and vertically offset from the fertilizer trench. This offset is formed because the seed tube outlet 62 is generally angled away from disc 22, as particularly shown in FIG. 3, such that the cutting member 44 forms a side bander. In one embodiment, the angle defined between the leading edge of the cutting member 44 and an axis transverse to the line of travel is preferably approximately 12 degrees, but other angles are possible and considered within the scope of the invention. The angle defined between the outlet 62 of the seed tube 42 and the plane of the planting surface is preferably approximately 30 degrees. The depth of the seed tube outlet 62 is less than the lower most edge of the disc 22 and the seed tube outlet 62 is laterally offset from the disc 22 clearly illustrating the vertical and horizontal spacing of the fertilizer and seed trenches.

Figure 4:
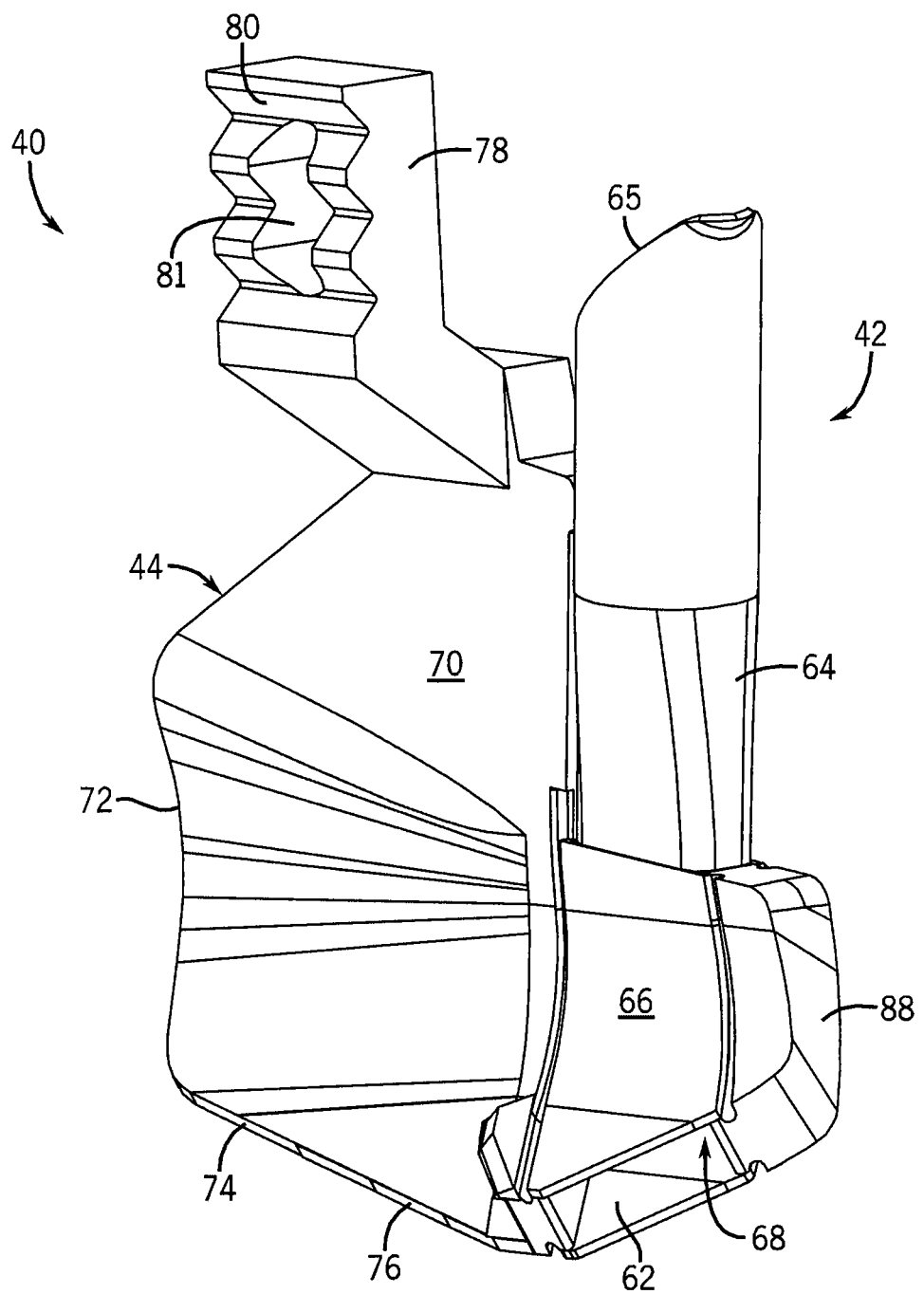
FIG. 4 is an isometric view of a secondary seed boot assembly of the opener shown in FIGS. 2-3.

As shown in FIG. 4, the seed boot assembly 40 includes the aforementioned seed tube 42, which has a generally uprightly oriented tubular member 64 that is mounted to, or is integrally formed with, the back edge of cutting member 44. The tubular member 64 has an inlet 65 that is coupled to a hose or other conduit (not shown) that is flow coupled with the air cart 14 in a known manner. The outlet 62 of the tubular member 64 is formed at the lower end of a curved boot 66 that defines a curved passage 68 which communicates with the interior volume of the tubular member 42. As shown in FIG. 3, the curvature of the boot 66 laterally offsets the outlet 62 from the inlet 65. The boot 66 may be mounted to or integrally formed with the tubular member 64. The cutting member 44 also has a generally curved body 70 that substantially matches the profile of the tubular member 64 and the curved boot 66. The curved body 70 defines a leading edge 74 that cuts a trench into the sidewall of the furrow and the seed is deposited into the trench as it passes through outlet 62. In this regard, the seed outlet 62 sits behind the cutting member 44, and more particularly, the leading edge 72 of the cutting member. The leading edge 72 also includes an angled portion 74 that in one embodiment includes a wear resistant insert 76, such as a carbide insert.

Figure 5:
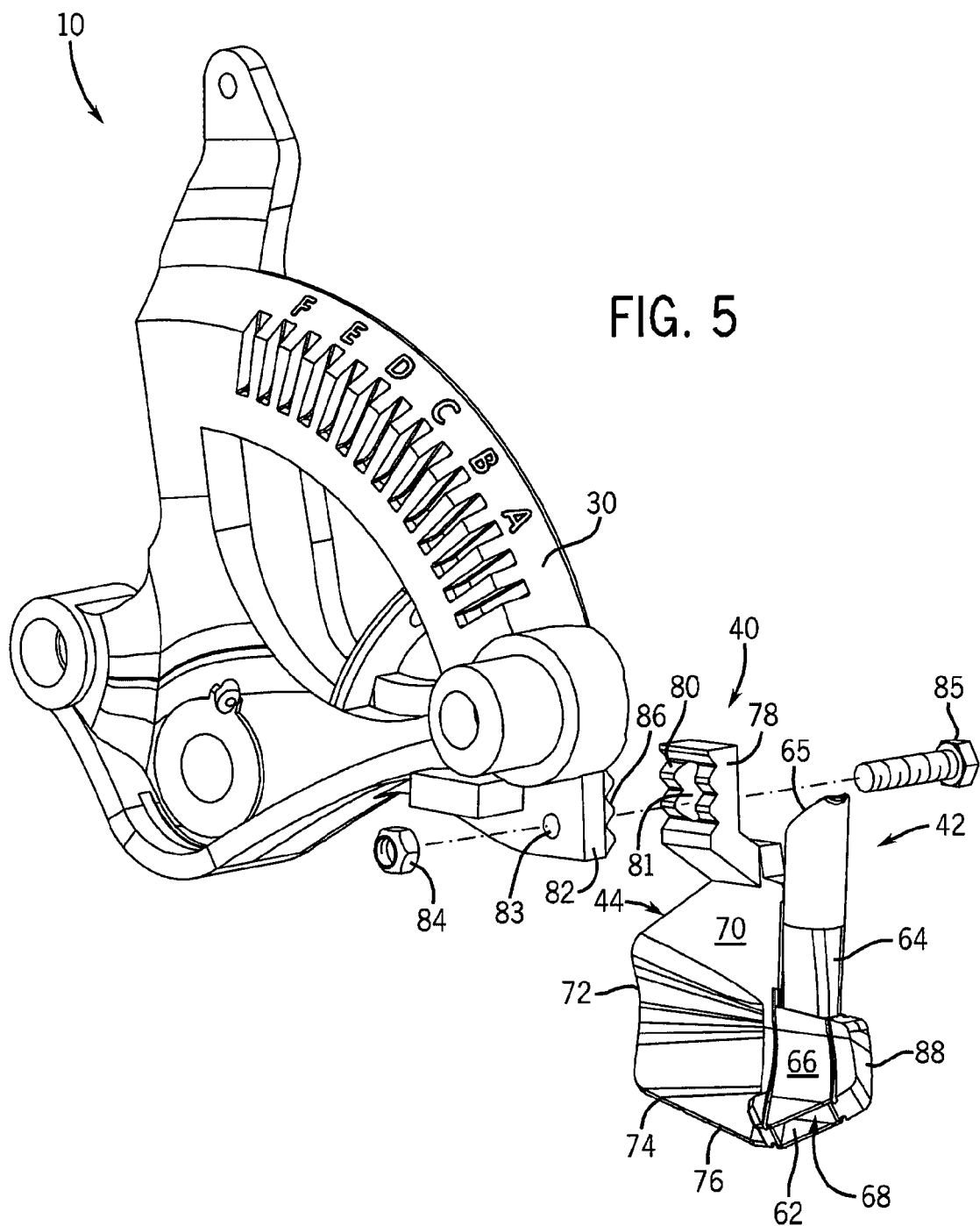
FIG. 5 is a partial exploded view of the opener of FIG. 2 illustrating one exemplary mounting of the secondary seed boot assembly of FIG. 4 to a frame of the opener.

With additional reference to FIG. 5, the assembly 40 further includes a mounting header 78 having a jagged engagement surface 80 with an elongated opening 81 that is configured to mate with a mounting flange 82 extending from the frame 30. The mounting flange 82 also has an opening 83 that aligns with opening 81, which allows a bolt 85 to be inserted into the openings 81, 83 and together with a nut 84, couples the mounting header 78 to the flange 82. It will be appreciated that the mounting flange 82 has a mounting face that includes ridges 86 complimentary to those of the mounting header 78.

The elongated opening 81 and the nut 84 allow the header 78 to be mounted at different heights relative to the mounting flange 82. In the illustrated embodiment, ridges 86 provide two different positions or heights at which the assembly 40 may be mounted. As such, the depth at which the seed trench is cut and seed is deposited can be adjusted. It is contemplated that the mounting flange 82 may have more than or fewer than three ridges so that more than or fewer than two mounting positions are provided. Additionally, it is contemplated that other types of mounting arrangements could be used to couple the assembly 40 to the frame 30. In yet a further embodiment, the assembly 40 is mounted to the trailing arm 48, for example.

Referring briefly again to FIG. 4, the assembly 40 preferably also includes a generally curved wall support member 88 extending from the back edge of the curved boot 66. Member 88 is designed to ride against the sidewall of the furrow to help hold the trench open and prevent soil and/or debris from clogging the seed outlet 62.

The present invention provides an opener of relatively compact design in which a fertilizer boot a seed boot, and a rotatable disc are mounted to the same disc mount. The seed boot has an angled cutting tip that cuts a ledge into the sidewall of a furrow formed by the rotatable disc. A seed tube rearward of the cutting tip deposits seed onto the ledge. A trailing press wheel then packs the fertilizer and seed. The ledge is cut vertically and horizontally spaced from the bottom of the furrow (fertilizer trench). In this regard, seed and fertilizer are deposited with vertical and horizontal stratification allowing higher concentrations of fertilizer to be used. In addition to providing a compact design, the present invention avoids the complexities associated with double shoot planting units that have multiple discs to cut fertilizer and seed trenches. In addition, the present invention provides less soil disturbance compared to conventional double shoot, single pass planting units, especially when furrowing at faster speeds, e.g., greater than 5 m.p.h.

Additionally, the invention has been described with respect to a fertilizer tube and a seed tube. It is understood that the aforedescribed fertilizer tube could be used to deposit fertilizer and/or seed and the aforedescribed seed tube could be used to deposit seed and/or fertilizer.

Many changes and modifications could be made to the invention without departing from the spirit thereof. The scope of these changes will become apparent from the appended claims.

We claim:

1. A product dispensing apparatus for use with an agricultural implement, the agricultural implement including a rotatable disc for cutting a furrow into soil and a scraper blade adjacent the rotatable disc for keeping a leading face of the rotatable disc clear of debris, the product dispensing apparatus comprising:
   a tubular member having a first end adapted to receive a product, a body adapted to pass the product, and a second end through which product exits the body, wherein the tubular member has a leading side and a trailing side;
   a cutting member having a body attached to the leading side of the tubular member and adapted to cut a trench into a sidewall of the furrow; and
   an adjustable mount for interconnecting the tubular member and the cutting member to the agricultural implement, the mount having a plurality of user selectable positions;
wherein movement of the mount between the plurality of user selectable positions adjusts the positions of the tubular member and the cutting member independent of a position of the scraper blade.

2. The apparatus of claim 1 wherein the cutting member is integrally formed with the tubular member.

3. The apparatus of claim 2 wherein the cutting member has a curved cutting edge that cuts the trench to be offset from a low point of the furrow.

4. The apparatus of claim 3 wherein the trench is cut horizontally and vertically offset from the low point of the furrow.

5. The apparatus of claim 1 wherein the cutting member has a cutting edge that is angled relative to an axis transverse to a line of travel of the apparatus, wherein the cutting is at an angle of approximately 12 degrees relative to the axis.

6. The apparatus of claim 1 wherein the cutting member includes a wear resistant element.

7. The apparatus of claim 6 wherein the wear resistant element is formed of carbide.

* * * * *